United States Patent [19]

Shibata et al.

[11] Patent Number: 5,493,493

[45] Date of Patent: Feb. 20, 1996

[54] CONTROL SYSTEM FOR PASSENGER PROTECTING APPARATUS

[75] Inventors: Jun Shibata, Sagamihara; Hiroaki Oobayashi, Ishehara; Makoto Kimura, Sagamihara; Syuuzo Fukuzumi, Zama, all of Japan

[73] Assignee: Nissan Motor Co., Ltd., Kanagawa, Japan

[21] Appl. No.: 127,539

[22] Filed: Sep. 28, 1993

[30] Foreign Application Priority Data

Sep. 28, 1992 [JP] Japan ...................... 4-258456

[51] Int. Cl.⁶ ...................... B60R 21/32
[52] U.S. Cl. .................. 364/424.05; 340/436; 307/10.1; 380/735; 180/274
[58] Field of Search ............ 364/424.05; 340/436, 340/437, 438; 280/735; 307/10.1; 180/274

[56] References Cited

U.S. PATENT DOCUMENTS

| | | | |
|---|---|---|---|
| 4,410,875 | 10/1983 | Spies et al. | 280/735 |
| 4,994,972 | 2/1991 | Diller | 364/424.05 |
| 5,021,678 | 6/1991 | Diller | 307/10.1 |
| 5,065,322 | 11/1991 | Mazur et al. | 364/424.05 |
| 5,081,587 | 1/1992 | Okano | 364/424.05 |
| 5,109,341 | 4/1992 | Blackburn et al. | 364/424.05 |
| 5,182,459 | 1/1993 | Okano et al. | 307/10.1 |
| 5,256,904 | 10/1993 | Tohbaru | 307/10.1 |
| 5,339,242 | 8/1994 | Reid et al. | 364/424.05 |
| 5,363,302 | 11/1994 | Allen et al. | 364/424.05 |

FOREIGN PATENT DOCUMENTS

| | | |
|---|---|---|
| 0440133A2 | 1/1991 | European Pat. Off. . |
| 63-503531 | 12/1988 | Japan . |
| 1337481 | 4/1971 | United Kingdom . |
| 1462344 | 9/1975 | United Kingdom . |

OTHER PUBLICATIONS

Mohanty, Nirode, *Random Signals Estimation and Identification*, Van Nostrand Reinhold, pp. 212, 238–241.

Freund, Rudolf and Wilson, *Statistical Methods*, Harcourt Brace Javanovich, pp. 20–23.

*Primary Examiner*—Kevin J. Teska
*Assistant Examiner*—Tyrone V. Walker
*Attorney, Agent, or Firm*—Lowe, Price, LeBlanc & Becker

[57] ABSTRACT

A control system for a passenger protecting apparatus includes: a sensor (100) for detecting vehicle deceleration values; a calculating section (101) for calculating a deceleration dispersion value (Bu) on the basis of the detected deceleration values; a deciding section (103) for deciding whether the passenger protecting apparatus is activated or not, on the basis of the calculated deceleration dispersion value; and a drive and control section (104) for activating the passenger protecting apparatus when the activating section decides the activation of the passenger protecting apparatus (102). The control system can activate an air bag module or seat belt reliably in any collision modes by a simple adjustment.

18 Claims, 7 Drawing Sheets

CONTROL SYSTEM FOR PASSENGER PROTECTING APPARATUS

TECHNICAL FIELD

The present invention relates to a control system for a passenger protecting apparatus, and more specifically to a control system for deciding whether the passenger protecting apparatus must be activated or not in various collision modes.

BACKGROUND ART

A control system for a passenger protecting apparatus for an automotive vehicle with the use of an air bag or a seat belt is disclosed in Japanese Patent Laid Open No. 63-503531 (corresponding to PCT/DE87/00078), for instance. In this control system, a deceleration of an automotive vehicle is detected by a deceleration sensor. The detected deceleration is compared with an Integration threshold. When the deceleration exceeds the integration threshold, the deceleration beyond the integration threshold is integrated. The integrated deceleration is further compared with a predetermined value. When the integrated deceleration exceeds the predetermined value, a passenger protecting apparatus is activated. Further, the integration threshold value is changed according to the magnitude of the integration value, in order to protect a passenger more securely according to various modes of collisions.

In the above-mentioned prior art control system for a passenger protecting apparatus, however, since the integration threshold is adjusted finely according to various collision modes, there exists a problem in that the adjustment process is complicated and further it takes a time to adjust the integration threshold.

SUMMARY OF THE INVENTION

Accordingly, the object of the present invention is to provide a control system for a passenger protecting apparatus which can securely determine whether or not the passenger protecting apparatus must be activated, in various collision modes, in spite of a simple adjustment.

To achieve the above-mentioned object, the present invention provides a control system for a passenger protecting apparatus, comprising: means for detecting vehicle deceleration values; means for calculating a deceleration dispersion value on the basis of the detected deceleration values; means for deciding whether the passenger protecting apparatus is activated or not, on the basis of the calculated deceleration dispersion value; and drive and control means for activating the passenger protecting apparatus when said deciding means decides the activation of the passenger protecting apparatus.

Further, the present invention provides a control system for a passenger protecting apparatus, comprising: means for detecting vehicle deceleration values; means for calculating a sum total of squares of differences between the deceleration values and an averaged deceleration value obtained within a predetermined time period, on the basis of the detected deceleration values; means for deciding whether the passenger protecting apparatus is activated or not, on the basis of the calculated sum total value; and drive and control means for activating the passenger protecting apparatus when said deciding means decides the activation of the passenger protecting apparatus. Further, calculating means calculates an integration value of the sum total of squares of differences between the deceleration values and an averaged deceleration value obtained within a predetermined time period, with respect to time; and said deciding means decides the activation of the passenger protecting apparatus on the basis of the further calculated integration value.

Further, the control system for a passenger protecting apparatus further comprises: means for deciding a timing at which the passenger protecting apparatus is activated on the basis of the detected deceleration values; and said drive and control means activates the passenger protecting apparatus, when said deciding means decides the activation of the passenger protecting apparatus, at the timing decided by said timing deciding means.

Further, the present invention provided a method of activating a passenger protecting apparatus, comprising the is steps of: detecting vehicle deceleration values g at sampling times; detecting vehicle collision on the basis of the detected deceleration values; calculating deceleration status Bu by the steps of: obtaining a sum total value L1 of deceleration values detected at previous sampling times; calculating an average deceleration value L on the basis of the calculated sum total deceleration value L1 and the current number N of samples; calculating a sum total value S of squares of differences between the calculated averaged deceleration value L and respective detected deceleration values g; and calculating a deceleration dispersion value Bu on the basis of the calculated sum total value S and the number T of samples; comparing the calculated deceleration dispersion value Bu with a predetermined threshold value THL; and if the calculated deceleration dispersion value Bu exceeds the threshold THL, activating the passenger protecting apparatus.

Further, the deceleration status calculating steps comprises: calculating a sum total value L1 of deceleration values detected at previous sampling times; calculating an average deceleration value L on the basis of the calculated sum total deceleration value L1 and the current number N of samples; and calculating a sum total value S (Bu1) of squares of differences between the calculated averaged deceleration value L and respective detected deceleration values g.

Further, the deceleration status calculating steps comprises: calculating a sum total value L1 of deceleration values detected at previous sampling times; calculating an average deceleration value L on the basis of the calculated sum total deceleration value L1 and the current number N of samples; calculating a sum total value S of squares of differences between the calculated averaged deceleration value L and respective detected deceleration values g; and calculating an integration value Bu2 of the calculated sum total values S with respect to time.

Further, the present invention provides a control system for activating a passenger protecting apparatus on the basis of vehicle deceleration values detected in case of collision, characterized in that: the passenger protecting apparatus is activated when a dispersion-based calculation value of the detected vehicle deceleration values exceeds a threshold value. The dispersion-based calculation value of the detected vehicle deceleration is a dispersion value (Bu) of the vehicle deceleration values detected within a predetermined time after collision, or a product (Bu1) of the dispersion value (Bu) of the vehicle deceleration values and the number T of samples, or an integration value (Bu2) of the product (Bu1) of the dispersion values (Bu) of the vehicle deceleration values and the number T of samples, with respect to time. Further, the threshold value is a linear function with respect to time.

As described above, in the first aspect of the control system for the passenger protecting apparatus according to the present invention, the activation of the passenger protecting apparatus is decided on the basis of the dispersion value (Bu) of the deceleration values g.

Further, in the second aspect of the control system for the passenger protecting apparatus according to the present invention, the activation of the passenger protecting apparatus is decided on the basis of the sum total value (Bu1) of the squares of the differences between the average deceleration value (L) and the respective deceleration values (g) (which corresponds to the product of the dispersion (Bu) and the number (T) of samples).

Further, in the third aspect of the control system for the passenger protecting apparatus according to the present invention, the activation of the passenger protecting apparatus is decided on the basis of the value (Bu2) obtained by further integrating the sum total value (Bu1) of the squares of the differences between the average deceleration value (L) and the respective deceleration values (g) with respect to time (which corresponds to the integration value of the product of the dispersion (Bu) and the number (T) of samples, with respect to time).

Consequently, it is possible to decide whether the passenger protecting apparatus must be activated in any collision modes on the basis of simple adjustment.

Further, In the control system according to the present invention, when the passenger protecting apparatus is determined to be activated, the protecting apparatus is activated at a timing determined on the basis of the deceleration values. Consequently, it is possible to activate the passenger protecting apparatus at an optimum timing in any collision modes.

DETAILED DESCRIPTION OF THE PREFERRED EMBODIMENTS

The embodiments of the control system for a passenger protecting apparatus according to the present invention will be described hereinbelow with reference to the attached drawings.

Figure 1:
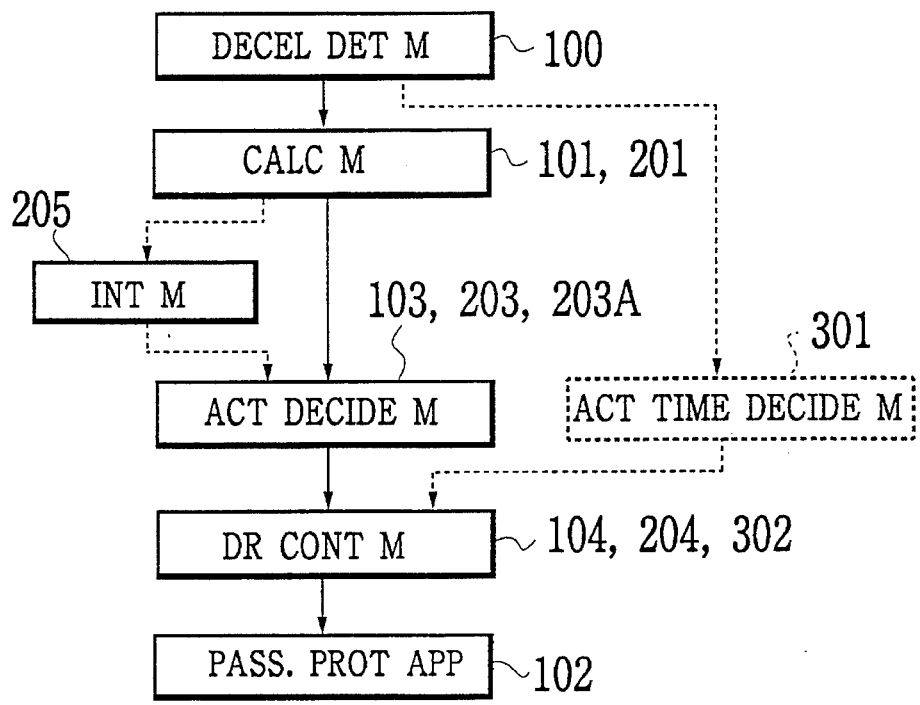
FIG. 1 is a block diagram showing a basic concept of the control system for a passenger protecting apparatus according to the present invention.

FIG. 1 is a basic concept of the control system according to the present invention. In the first aspect of the present invention, the system comprises means (100) for detecting vehicle deceleration; means (101) for calculating a dispersion value of the deceleration values detected by the deceleration detecting means (100); means (103) for deciding whether or not a passenger protecting apparatus (102) is activated on the basis of the dispersion value calculated by the dispersion calculating means (101); and drive and control means (104) for activating the passenger protecting apparatus (102) when the activation deciding means (103) decides the activation of the passenger protecting apparatus. That is, the activation of the passenger protecting apparatus is decided on the basis of the calculated dispersion value of vehicle deceleration values.

In the second aspect of the present invention, the system comprises means (100) for detecting vehicle deceleration; means (201) for calculating a sum total of squares of differences between deceleration values detected by the deceleration detecting means and the average deceleration value within a predetermined time; means (203) got deciding whether or not a passenger protecting apparatus (102) is activated on the basis of the sum total value calculated by the calculating means (201); and drive and control means (204) for activating the passenger protecting apparatus (102) when the activation deciding means (203) decides the activation of the passenger protecting apparatus (102). That is, the activation of the passenger protecting apparatus is decided on the basis of the sum total value of squares of differences between deceleration values and an averaged deceleration value within a predetermined time.

In the third aspect of the present invention, the control system further comprises means (205) for further integrating the sum total value calculated by the calculating means (201), and the activation deciding means (203A) decides whether or not the passenger protecting apparatus (102) is activated on the basis of the integration value of the integrating means (205). That is, the activation of the passenger protecting apparatus is decided on the basis of the further integration value of the sum total value obtained in the second aspect of the present invention.

Further, in the fourth aspect of the present invention, the control system further comprises means (301) for deciding a timing at which the passenger protecting apparatus (102) is activated on the basis of the deceleration detected by the deceleration detecting means (100), and means (302) for activating the passenger protecting apparatus (102) at the timing decided by the activation deciding means (301), whenever the activation deciding means (103, 203. 203A) has decided the activation of the passenger protecting apparatus (102).

In the first aspect of the present invention, the passenger protecting apparatus is activated on the basis of the dispersion value of vehicle deceleration values. In the second aspect of the present invention, the passenger protecting apparatus is activated on the basis of the sum total values of squares of differences between deceleration values and the average deceleration value (which corresponds to the product of the dispersion and the number of samples). In the third aspect of the present invention, the passenger protecting apparatus is activated by further integrating the sum total of squares of differences between deceleration values and the average deceleration value (which corresponds to the integration value of the product of the dispersion and the number of samples, with respect to time). Further, in the fourth aspect of the present invention, the passenger protecting apparatus is activated at a timing decided on the basis of the vehicle deceleration, whenever the activation of the protecting apparatus is decided.

First Embodiment

The first embodiment will be described hereinbelow with reference to FIGS. 2 to 7.

Figure 2:
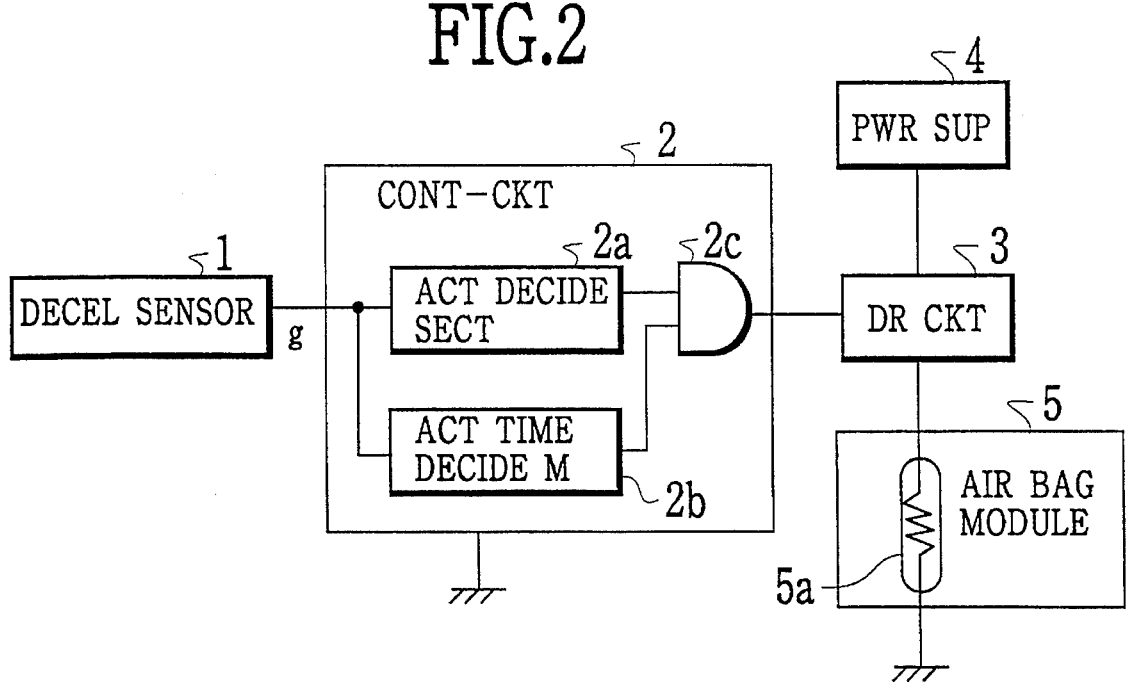
FIG. 2 is a block diagram showing an embodiment of the control system according to the present invention.

In FIG. 2, the control system comprises a deceleration sensor 1, a control circuit 2, a driver circuit 3, a power supply 4 and an air bag module 5. The decelerator 1 sensor is disposed on a floor tunnel portion in a vehicle room. The decelerator sensor 1 detects vehicle deceleration and outputs the detected deceleration values g to the control circuit 2 at predetermined sampling times. The control circuit 2 is composed of a microcomputer, memory unit and other peripheral parts. The control circuit 2 controls the activation of the air bag module 5 (passenger protecting apparatus) by executing a control program (described later in detail). The control circuit 2 Includes an activation deciding section 2a for deciding whether the air bag module 5 must be activated or not, an activation timing deciding section 2b for deciding the activation timing, and an AND circuit 2c for outputting an activation signal to the driver circuit 3 when the activation deciding section 2a outputs an activation command signal and further the activation timing deciding section 2b outputs an activation timing signal. In response to the activation signal of the control circuit 2, driver circuit 3 turns on an electric ignition device (referred to as a squib, hereinafter) 5a of the air bag module 5 on the basis of power supplied by the power supply 4, in order to activate an expansion device (referred to as an inflator, hereinafter) of the air bag module 5. This air bag module 5 is housed within a center pad of a steering wheel and expands to protect a driver from shock in case of collision.

Further, in the embodiment, although the air bag for protecting a vehicle driver from a collision shock has been explained as an example of the passenger protecting apparatus, it is of course possible to apply the control system according to the present invention to the other air bags or seat belts for protecting other front and rear seat passengers (not driver).

The activation timing deciding section 2b will be described hereinbelow.

In the case of the passenger protecting apparatus, in general there exists an activation delay time between the activation start and activation completion determined by the apparatus. Accordingly, the timing of the squib 5a; that is, the activation timing of the air bag module 5 must be determined in such a way that Immediately after the air bag has been expanded perfectly, the driver leaned forward due to collision is brought into contact with the air bag, in order to protect the passenger most effectively from shock of collision.

The activation timing is determined under due consideration of a distance between the expanded air bag and the driver (i.e., the driver's seat position) and the above-mentioned activation delay time of the air bag. For instance, when the activation delay time of the air bag is 30 ms and the distance between the perfectly expanded air bag and the driver is 4 inch, the air bag module 5 must be activated at such a timing as 30 ms before the driver is moved forward by 4 inch due to collision.

On the other hand, before collision, since the driver in an automotive vehicle moves at a speed the same as the vehicle speed, the relative speed between the driver and the vehicle is zero. However, once the vehicle collides against an object, although the vehicle speed drops suddenly, the driver speed Is kept at the vehicle speed before collision, with the result that a high relative speed is generated between the driver and the vehicle. The above-mentioned movement distance of the driver after collision is obtained by integrating the relative speed v between the driver and the vehicle after collision, with respect to time t. Accordingly, when the vehicle collides against an object at high speed, the relative speed between both is large, so that the driver moves the distance of 4 inch at a short time. In contrast with this, when the vehicle collides against an object at low speed, the relative speed is small, so that the driver moves by the distance of 4 inch slowly.

As described above, the activation timing can be determined on the basis of the relative speed between the driver and the vehicle after collision. In more practice, the air bag module 5 is activated at a timing when the relative speed v exceeds a previously determined value v1. Therefore, when the vehicle collides at high speed, since the deceleration value g of the vehicle is large, the relative speed v increases rapidly, with the result that tile relative speed v exceeds the set value v1 immediately. On the other hand, when the vehicle collides at low speed, since the deceleration value g is small, the relative speed v increases slowly, with the result that the relative speed v exceeds the set value v1 slowly. In summary, the timing at which the passenger protecting apparatus is activated is decided on the basis of the detected vehicle deceleration.

The method of deciding whether the activation is required or not will be described hereinbelow.

Figure 3:
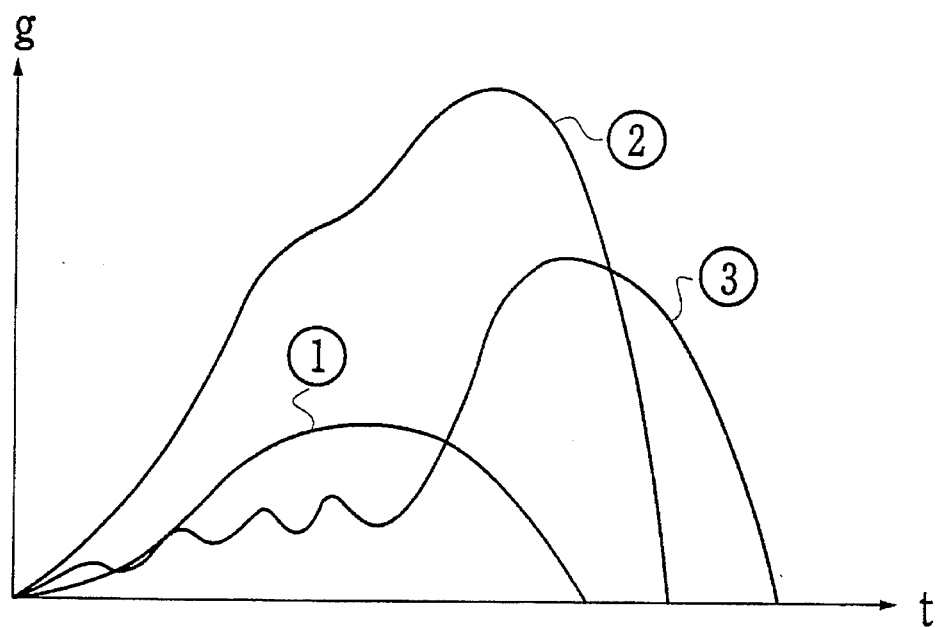
FIG. 3 is a graphical representation showing the variation of vehicle deceleration in various collision modes.

FIG. 3 shows the variation in deceleration value g in three typical collision modes. In FIG. 3, the deceleration curve (1) indicates a slight collision. The curve (1) of the deceleration value g after collision represents the characteristics near a sine wave with a low peak value. With respect to this slight collision, it is unnecessary to activate the passenger protecting apparatus. This mode of collision is referred to as non-activation collision.

The deceleration curve (2) indicates a severe collision. The curve (2) of the deceleration value g after collision represents the characteristics near a sine wave with a high peak value. With respect to this severe collision, it is necessary to activate the passenger protecting apparatus securely. This mode of collision is referred to as high speed collision.

The deceleration curve (3) indicates first a relatively slight vibrating collision and thereafter a severe collision. The curve (3) of the deceleration value g after collision represents the characteristics near a sine wave with a high peak value in the second half of collision. With respect to this second half severe collision, it is necessary to activate the passenger protecting apparatus securely. This mode of collision is referred to as low speed collision.

Here, in both the cases of the non-activation collision (1) and the low-speed collision (3), since the deceleration value g is relatively low in the first half, it is difficult to accurately distinguish one form the other on the basis of only the deceleration g. To overcome this problem, in this embodiment, the dispersion Bu of the deceleration value g is calculated to determine the vehicle deceleration status in the respective collision modes in accordance with the following formula:

$$Bu = \Sigma(gI - L)^2 / T \qquad (1)$$

where gI (I=1 to T) denotes deceleration values detected at sampling times repeatedly; T denotes the number of samples of the detected deceleration values g; L denotes an average value of sampled deceleration values gI; and $\Sigma$ denotes a sum total (or integration value) of squares of the differences between the sampled deceleration values gI and the average deceleration value L.

Figure 4:
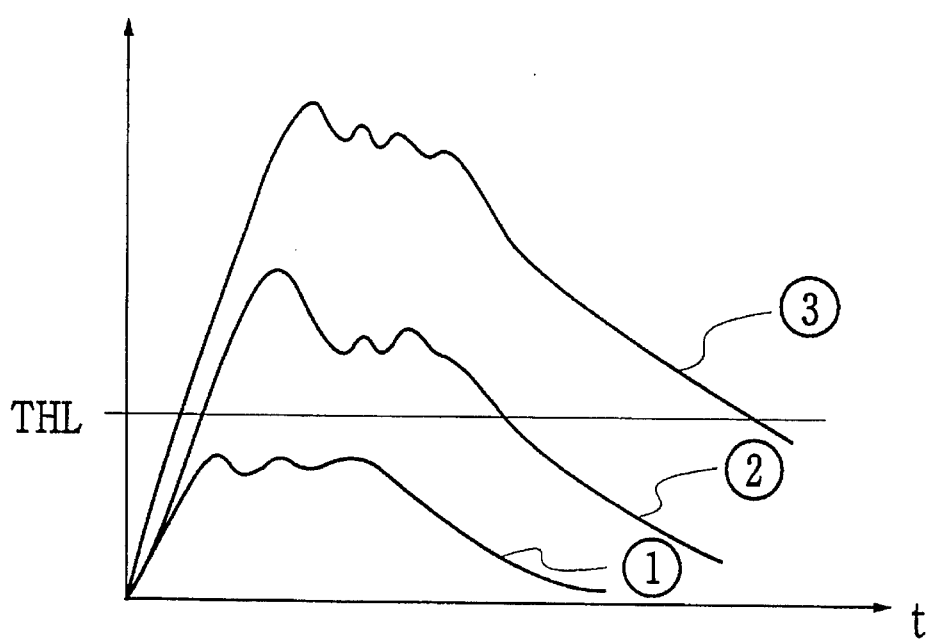
FIG. 4 is a graphical representation showing deceleration dispersion values in various collision modes shown in FIG. 3.

FIG. 4 shows the dispersion Bu of the deceleration value g in each of the respective collision modes. In the case of the low-speed collision mode (3), since the variation in deceleration value g is large at the first half of the collision as shown in FIG. 3, the dispersion Bu is large. In the case of the non-activation collision (1), since the variation in deceleration value g is small, the dispersion Bu is small. Further, in the case of the high-speed collision (2), although the variation in deceleration value g is small, since the deceleration value g is large as compared with the other two collision modes, the dispersion Bu is relatively large.

FIG. 4 indicates that it is possible to clearly distinguish the low-speed collision (3) and the high-speed collision (2) which both require the activation of the passenger protecting apparatus from the non-activation collision (1) which does not require the activation of the passenger protecting apparatus, by deciding whether the protecting apparatus must be activated or not on the basis of the dispersion Bu of the deceleration values g. In more detail, a threshold value THL of dispersion Bu is determined to distinguish the non-activation collision (1) from the high- and low-speed collisions (2, 3), and when the deceleration dispersion Bu exceeds this threshold value THL, the activation of the passenger protecting apparatus is decided.

Figure 5:
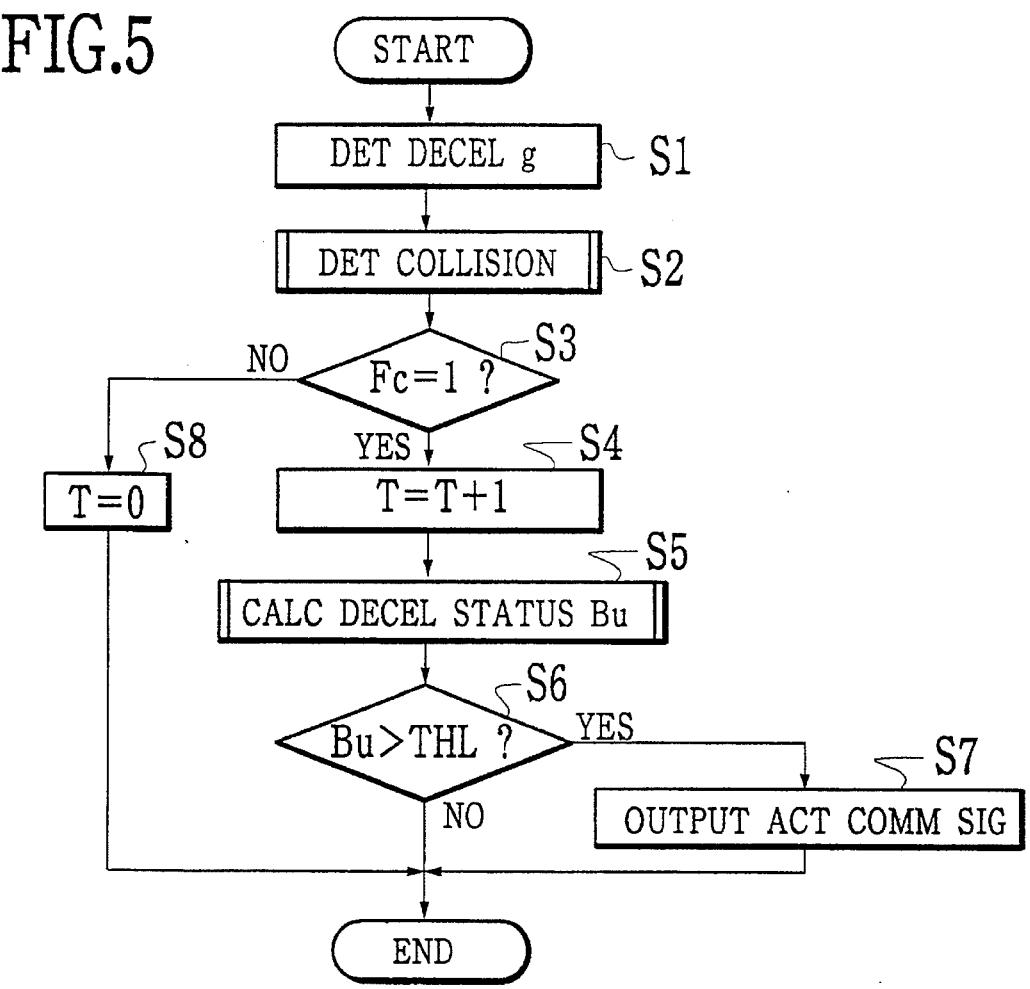
FIG. 5 is a flowchart for assistance in explaining a control program of a first embodiment of the present invention.

FIG. 5 is a flowchart showing the control program of deciding activation of the protecting apparatus, which is executed by the control circuit 2. The operation of the First embodiment will be described hereinbelow with reference to this flowchart.

The control circuit 2 executes this control program at predetermined time intervals. In step S1, control (the control circuit 2) reads the vehicle deceleration value g detected by the deceleration sensor 1. In step S2, control executes a collision subroutine as shown in FIG. 6.

Figure 6:
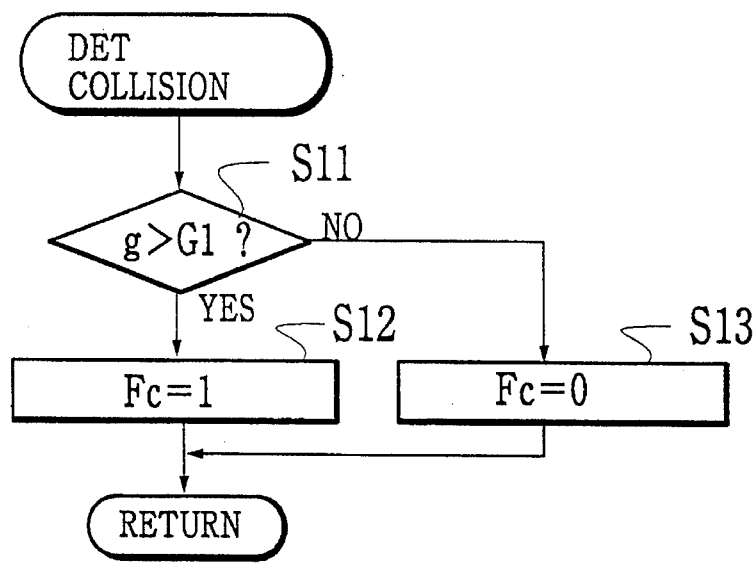
FIG. 6 is a flowchart for assistance in explaining a subroutine for detecting vehicle collision.

In FIG. 6, a vehicle collision can be detected on the basis of the detected deceleration g. That is, in step S11 of FIG. 6, control checks whether the detected deceleration value g is larger than a predetermined value G1. If the detected deceleration value g is larger than the predetermined value G1, control decides a collision. In step S12, control sets a collision detection flag Fc. If the detected deceleration value g is equal to or lower than the predetermined value G1, control decides a non-collision. In step S13, control clears a collision detection flag Fc. Thereafter, control returns to the program shown in FIG. 5 again. Further, as the method of detecting collision is not limited only to the above-mentioned method. For instance, it is possible to detect a vehicle collision by use of a G switch for outputting a collision signal when vehicle deceleration exceeds a predetermined value, piezoelectric sensors arranged at various positions of the vehicle to detect various distortions caused by vehicle collision, etc.

In step S3 of FIG. 5, control checks whether the collision detection flag Fc is set or not. If set, in steps S4 and after, control executes various collision processing. If not set, In step S8, control clears a counter T and ends the program execution. Here, the counter T is used to count the number of samples of the deceleration values g used for calculating the vehicle deceleration status (dispersion), as described later in further detail.

Figure 7:
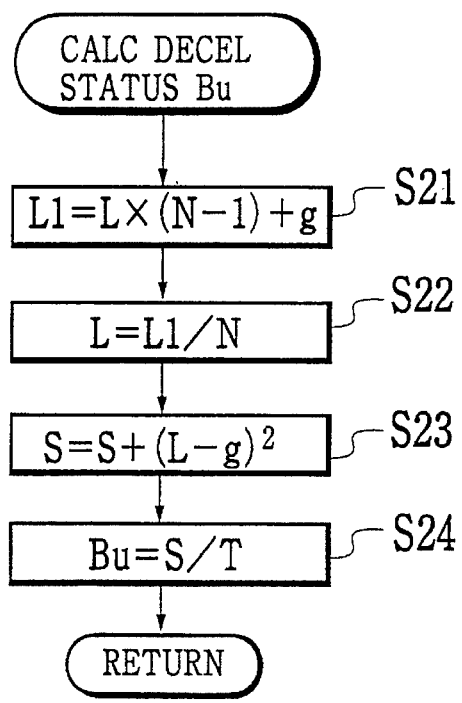
FIG. 7 is a flowchart for assistance in explaining a subroutine for calculating the vehicle deceleration status for the first embodiment.

In step S4, control increments the counter T. In step S5, control executes a subroutine as shown in FIG. 7 to calculate the vehicle deceleration status. In this first embodiment, the vehicle deceleration status is obtained by calculating the dispersion Bu of deceleration values g in accordance with the formula (1).

In more detail, in step S21 of FIG. 7, control calculates the sum total value L1 of all the deceleration values g so far sampled in accordance with the following formula:

$$L1 = L \times (N-1) + g \qquad (2)$$

where N denotes the constant number of samples so far executed; L denotes an average value of the deceleration values obtained until the preceding sampling time; and g denotes the current deceleration value.

In step S22, control calculates an average value L of the deceleration value g obtained until the current sampling time in accordance with the following formula:

$$L = L1/N \qquad (3)$$

In the above formulae (2) and (3), the average deceleration value L within a predetermined time is calculated on the basis of a weighted average method using the deceleration values g obtained from the start of collision to the latest sampling time. Without being limited thereto, however, it is also possible to adopt a moving average method using the deceleration values g obtained within the latest constant time interval.

In step S23, control calculates a sum total (integration) value S of the squares of differences (L–g) between the average value L and the deceleration values g so far detected in accordance with the following formula:

$$S = S + (L-g)^2 \qquad (4)$$

The formula (4) indicates that the left side value is replaced with the right side value whenever the counter T is incremented and further the right side value is an addition of a preceding sum total value S and the current square of the difference (L–g).

Further, in step S24, control calculates the dispersion Bu of the deceleration value g as follows:

$$Bu = S/T \qquad (5)$$

where T denotes the number of samples.

After the dispersion Bu has been calculated, control returns to the program shown in FIG. 5. Here, the steps S23 and S24 correspond to the calculating means 101 and 201.

In step S6 of FIG. 5, control checks whether the current vehicle deceleration status; that is, the dispersion Bu of the deceleration valued g is larger than a threshold value THL. If larger than the threshold THL, in step S7, control outputs an activation command signal to the AND circuit 2c. If equal to or smaller than the threshold THL, control ends the program execution.

As a result of the execution of the above-mentioned program, when the control circuit 2 decides that the air bag module 5 must be activated, the activation deciding section 2a outputs an activation command signal to the AND circuit 2c. At this time, when an activation timing signal is outputted from the activation timing deciding section 2b to the AND circuit 2c, the AND circuit 2c outputs a signal for activating the air bag module 5 to the driver circuit 3. In response to the activation signal, the driver circuit 3 turns on the squib 5a of the air bag module 5 to ignite the inflator, so that the air bag is expanded. Consequently, after the air bag has been expanded completely, since the passenger leaned forward is brought into contact with the expanded air bag, it is possible to protect the passenger from shock due to collision.

As described above, in this first embodiment, the dispersion Bu of the detected deceleration values g is calculated. A threshold level THL of the dispersion Bu is determined. The collision which requires the activation of the passenger protecting apparatus is discriminated from the collision which does not require the activation of the passenger protecting apparatus or vice versa on the basis of the calculated dispersion Bu of the deceleration values g. That is, since the passenger protecting apparatus is activated only when the calculated dispersion Bu of the deceleration values g exceeds the threshold THL, it is possible to decide whether or not the passenger protecting apparatus must be activated in various collision modes and further to activate the passenger protecting apparatus at an optimum timing, on the basis of a simple adjustment.

Second Embodiment

The second embodiment of the present invention will be described hereinbelow.

In the first embodiment, the dispersion Bu of the deceleration values g is calculated to determine the vehicle deceleration status, and the activation of the passenger protecting apparatus is decided on the basis of the calculated dispersion Bu. In this second embodiment, the sum total value (Integration value) S of squares of the differences (L–g) between the average value L and the deceleration values g as shown by the formula (4) (described later) is used instead of the dispersion Bu, and the activation of the passenger protecting apparatus is decided on the basis of the calculated sum total value S. Here, the above-mentioned sum total S is the product of the dispersion Bu and the number T of samples. Further, the construction of this second embodiment is basically the same as with the case of the first embodiment, so that any detailed description thereof is omitted herein.

Here, when the vehicle deceleration status of the second embodiment is represented by Bu1, the formula (4) can be expressed as $$Bu1 = Bu1 + (L-g)^2 \qquad (4A)$$

Figure 8:
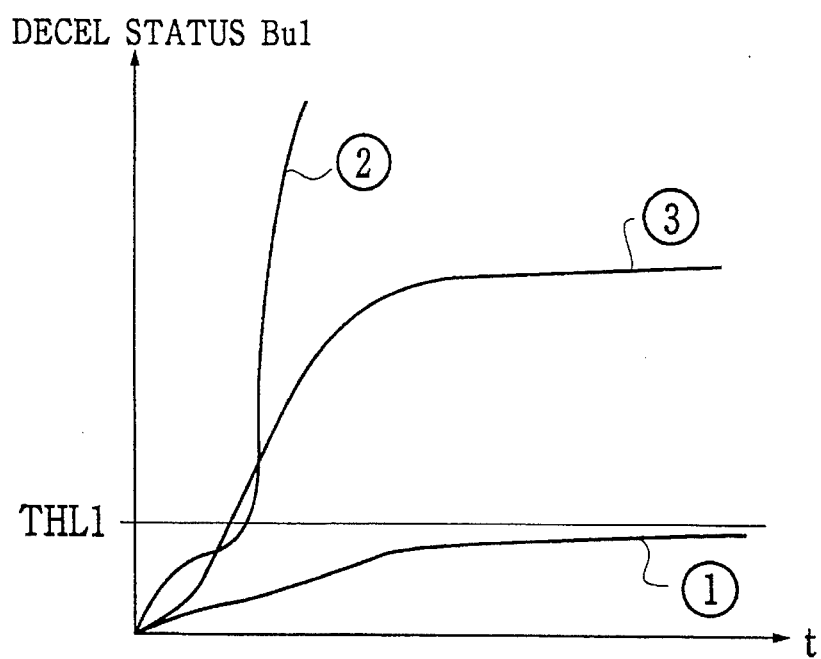
FIG. 8 is a graphical representation showing the status of vehicle deceleration in the various collision modes shown in FIG. 3 for assistance in explaining a second embodiment.

FIG. 8 shows the calculated results of the deceleration status Bu1 in the respective collision modes shown in FIG. 8, which are obtained in accordance with the formula (4A). FIG. 8 indicates that it is possible to distinguish more clearly the non-activation collision (1) which does not require activating the passenger protecting apparatus from the low- and high-speed collisions (3) and (2) which require activating the passenger protecting apparatus. In practice, a threshold THL1 of the deceleration status Bu1 is determined, and the passenger protecting apparatus is activated when the calculated deceleration status Bu1 exceeds this threshold value THL1.

Figure 9:
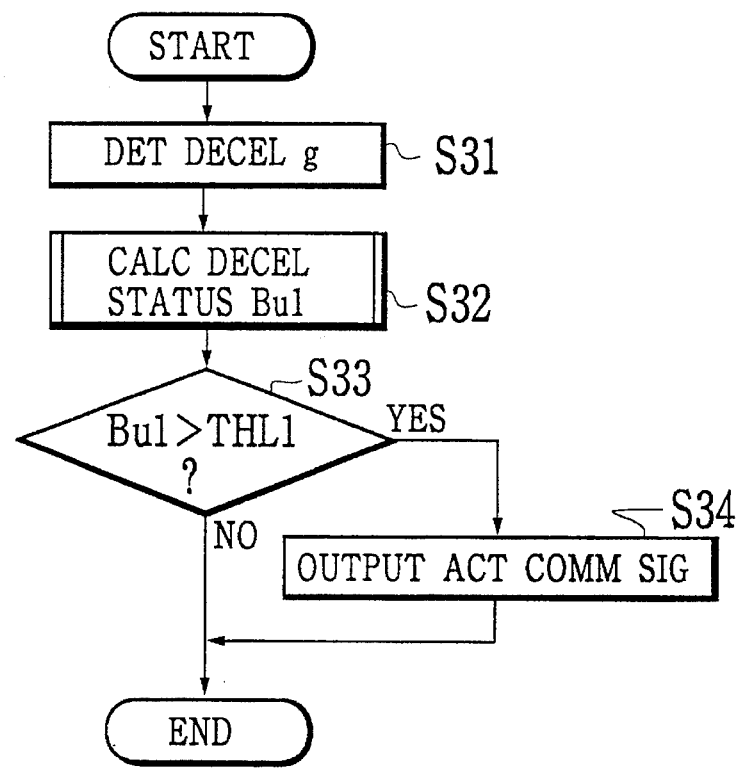
FIG. 9 is a flowchart for assistance in explaining a control program of a second embodiment of the present invention.

FIG. 9 is a flowchart showing the control program of deciding the activation of the protecting apparatus, which is executed by the control circuit 2. The operation of the second embodiment will be described hereinbelow with reference to this flowchart.

Figure 10:
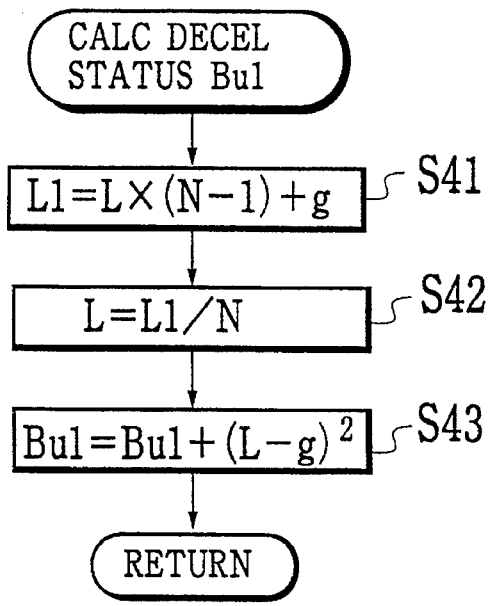
FIG. 10 is a flowchart for assistance in explaining a subroutine for calculating the vehicle deceleration status for the second embodiment.

The control circuit 2 executes this control program at predetermined time intervals. In step S31, control (the control circuit 2) reads the vehicle deceleration value g detected by the deceleration sensor 1. In step S32, control executes a subroutine for calculating the vehicle deceleration status Bu1 as shown in FIG. 10. A vehicle collision can be detected on the basis of the calculated deceleration status Bu1.

That is, in step S41 of FIG. 10, control calculates a sum total L1 of all the deceleration values g so far detected in accordance with the formula (2). Further, in step S42, control calculates an average value L of the deceleration values g so far detected in accordance with the formula (3). In step S43 (which corresponds to the calculating means 201), control calculates the vehicle deceleration status Bu1 in accordance with the formula (4A), and then returns to the program shown in FIG. 9.

In step S33 of FIG. 9, control checks whether the calculated vehicle deceleration status Bu1 is larger than the threshold value THL1. If larger than the threshold THL1, in step S34, control outputs an activation command signal to the AND circuit 2c. If equal to or smaller than the threshold THL1, control ends the program execution.

As a result of the execution of the above-mentioned program, when the control circuit 2 decides that the air bag module 5 must be activated, on the basis of the vehicle deceleration status Bu1, the activation deciding section 2a outputs an activation command signal to the AND circuit 2c. At this time, when an activation timing signal is outputted from the activation timing deciding section 2b to the AND circuit 2c, the AND circuit 2c outputs a signal for activating the air bag module 5 to the driver circuit 3. In response to the activation signal, the driver circuit 3 turns on the squib 5a of the air bag module 5 to ignite the inflator, so that the air bag is expanded. Consequently, after the air bag has been expanded completely, since the passenger leaned forward is brought into contact with the expanded air bag, it is possible to protect the passenger from shock due to collision.

As described above, in this second embodiment, the sum total value S (the integration value) of the squares of the differences between the average value L of the repeatedly detected deceleration values g and the respective deceleration values g is calculated. A threshold level THL1 of the calculated sum total S is determined. The collision which requires the activation of the passenger protecting apparatus is discriminated from the collision which does not require the activation of the passenger protecting apparatus or vice versa on the basis of the calculated sum total S. That is, since the passenger protecting apparatus is activated only when the calculated sum total S exceeds the threshold THL1, it is possible to decide whether or not the passenger protecting apparatus must be activated in various collision modes and further to activate the passenger protecting apparatus at an optimum timing, on the basis of a simple adjustment.

Further, the deceleration status Bu1 (the sum total value $S=\Sigma(L-g)^2$) of this second embodiment corresponds to the product of the dispersion value Bu and the number T of samples.

Third Embodiment

The third embodiment of the present invention will be described hereinbelow.

In the third embodiment, the activation of the passenger protecting apparatus is decided on the basis of an integration value obtained by further integrating the vehicle deceleration status Bu1 of the second embodiment. Further, the construction of this third embodiment is basically the same as with the case of the first embodiment, so that any detailed description thereof is omitted herein.

The vehicle deceleration status Bu2 is calculated by integrating the sum total (integration) value S of the squares of the differences between the deceleration values and the average value L obtained by the already-explained formula (4) as follows:

$$Bu2 = Bu2 + S \quad (6)$$

Figure 11:
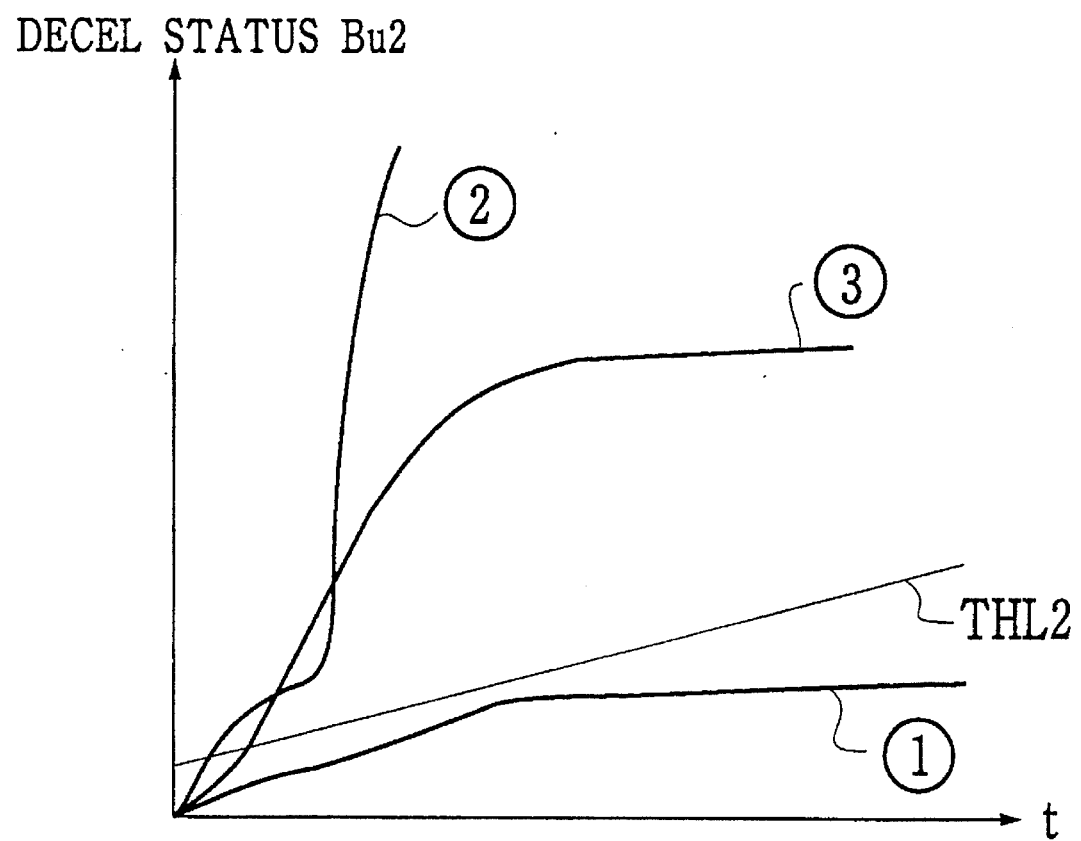
FIG. 11 is a graphical representation showing the status of vehicle deceleration in various collision modes shown in FIG. 3 for assistance in explaining a third embodiment.

FIG. 11 shows the calculated results of the deceleration status Bu2 in the respective collision modes shown in FIG. 3, which are obtained in accordance with the Formula (6). FIG. 11 indicates that it is possible to distinguish more clearly the non-activation collision (1) which does not require activating the passenger protecting apparatus from the low- and high-speed collisions (3) and (2) which require activating the passenger protecting apparatus. In practice, a threshold THL2 of the deceleration status Bu2 is determined, and the passenger protecting apparatus is activated when the calculated deceleration status Bu2 exceeds this threshold value THL2. Here, the threshold value THL2 is a linear function with respect to the time t, being different from the THL1 of the second embodiment.

Figure 12:
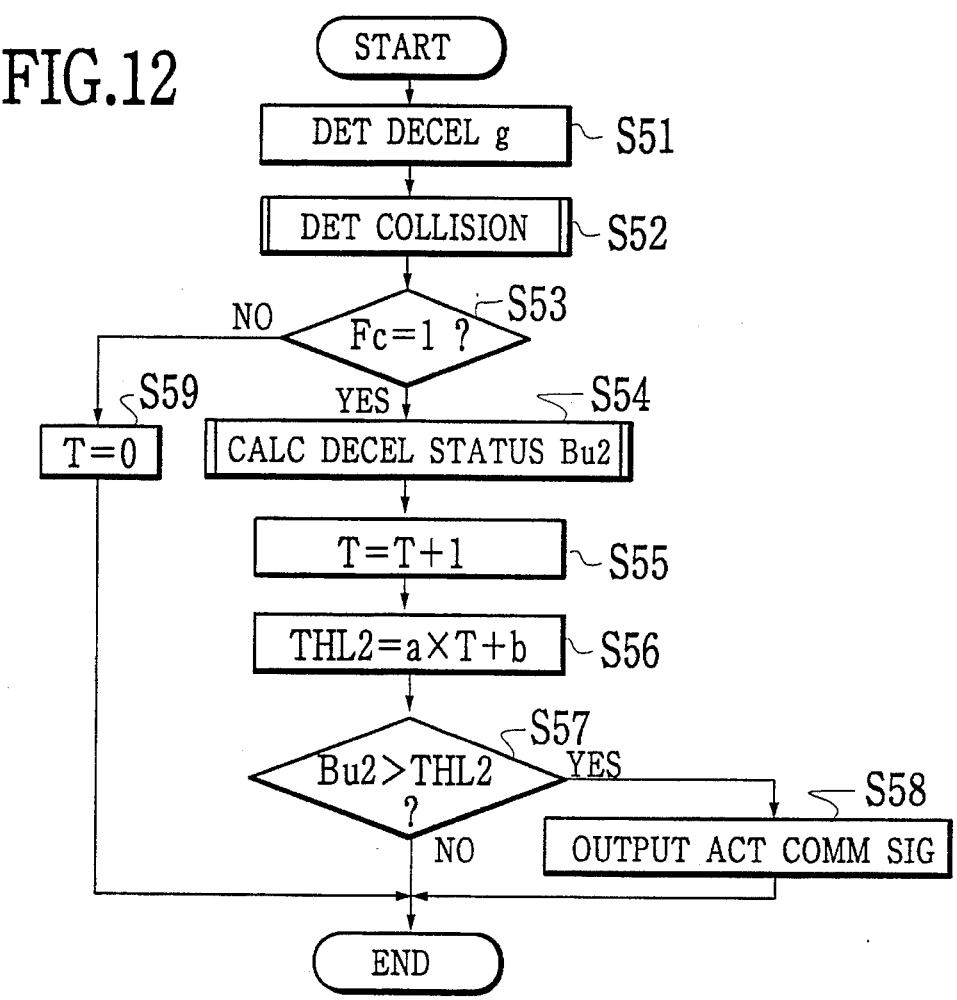
FIG. 12 is a flowchart for assistance in explaining a control program of the third embodiment of the present invention.

FIG. 12 is a flowchart showing the control program of deciding activation of the protecting apparatus, which is executed by the control circuit 2. The operation of the second embodiment will be described hereinbelow with reference to this flowchart.

The control circuit 2 executes this control program at predetermined time intervals in the same way as in the first and second embodiments. In step S51, control (the control circuit 2) reads the vehicle deceleration value g detected by the deceleration sensor 1. In step S52, control executes a collision subroutine as shown in FIG. 6.

In step S53, control checks whether the collision detection flag Fc is set or not. If set, in steps S54 and after, control executes various collision processing. If not set, in step S59, control clears a counter T and ends the program execution. Here, the counter T is used to count the number of samples of the deceleration values g used for calculating the vehicle deceleration status Bu2 (described later).

Figure 13:
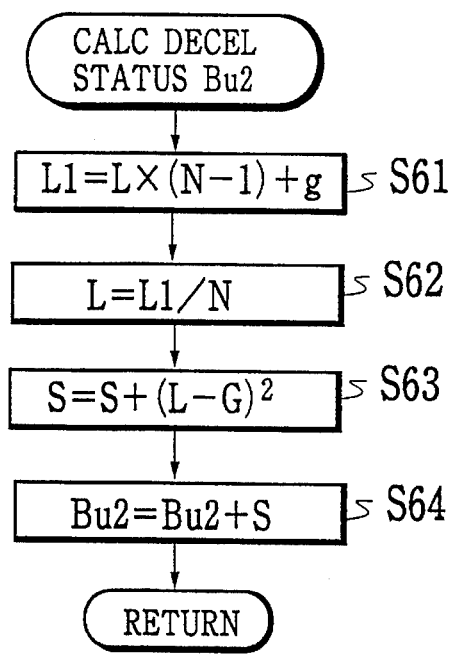
FIG. 13 is a flowchart for assistance in explaining a subroutine for calculating the vehicle deceleration status for the third embodiment.

When the collision detection flag Fc is set in step S53, in step S54 control calculates the vehicle deceleration status Bu2 by executing the subroutine as shown in FIG. 13.

That is, in step S61 of FIG. 13, control calculates the sum total value L1 of all the deceleration values g so far detected in accordance with the formula (2). In step S62, control calculates the average value L of the deceleration values g so far detected in accordance with the formula (3). Further, in step S63 (which corresponds to the calculating means 203A), control calculates the sum total value S of the squares of the differences between the deceleration values g and the average value L in accordance with the formula (4). Further, in step S64 (which corresponds to the integrating means 205), control integrates the sum total values S in accordance with the formula (6) to obtain the vehicle deceleration status Bu2, returning to the program shown in FIG. 12.

After having returned to FIG. 12, in step S55, control increments the counter T. Further, in step S56, control determines the threshold value THL2 in accordance with the following formula:

$$THL2 = a \times T + b \quad (7)$$

where a and b denote constants for determining a linear function of the threshold value THL2 with respect to the counted value of the counter T (the time t).

In step S57, control checks whether the vehicle deceleration status Bu2 already calculated is larger than the threshold value THL2. If larger than the threshold THL2, in step S58, control outputs an activation command signal. If equal to or smaller than the threshold THL2, control ends the program execution.

When the activation of the air bag module 5 has been decided on the basis of the vehicle deceleration status Bu2, the activation deciding section 2a outputs an activation command signal to the AND circuit 2c. At this time, when an activation timing signal is outputted from the activation timing deciding section 2b to the AND circuit 2c, the AND circuit 2c outputs a signal for activating the air bag module 5 to the driver circuit 3. In response to the activation signal, the driver circuit 3 turns on the squib 5a of the air bag module 5 to ignite the inflator, so that the air bag is expanded. Consequently, after the air bag has been expanded completely, since the passenger leaned forward is brought into contact with the expanded air bag, it is possible to protect the passenger from shock due to collision.

As described above, in this third embodiment, the sum total values (integration values) of the squares of the differences between the average value L of the repeatedly detected deceleration value g and the respective deceleration values g are further integrated. The linear threshold level THL2 of the integration values is determined. The collision which requires the activation of the passenger protecting apparatus is discriminated from the collision which does not require the activation of the passenger protecting apparatus or vice versa on the basis of the calculated vehicle deceleration status Bu2. That is, since the passenger protecting apparatus is activated only when the integrated value exceeds the threshold THL2, it is possible to decide whether or not the passenger protecting apparatus must be activated in various collision modes and further to activate the passenger protecting apparatus at an optimum timing, on the basis of a simple adjustment.

Further, the deceleration status Bu2 (the integration of the sum total value $S = (L-g)^2$) of this third embodiment corresponds to the integration value of the product of the dispersion value Bu and the number T of samples.

Further, in the above-mentioned embodiments, the deceleration sensor 1 corresponds to the deceleration detecting means (100); the activation deciding section 2a of the control circuit 2 corresponds to the calculating means (101, 201) and the activation deciding means (103, 203, 203A), and the integrating means (205); the activation timing deciding section 2b of the control circuit 2 corresponds to the activation timing deciding means (301); the AND circuit 2c and the driver circuit 3 of the control circuit 2 correspond to the drive control means (104, 204, 302); and the air bag module 5 corresponds to the passenger protecting apparatus (102), respectively.

As described above in the control system for the passenger protecting apparatus according to the present invention, the activation of the passenger protecting apparatus is decided on the basis of the dispersion value Bu of the deceleration values g (the first embodiment), or the value Bu1 obtained by integrating the squares of the differences between the average deceleration value (L) and the respective decelerations (g) (in the second embodiment), or the value Bu2 obtained by further integrating the value Bu2 obtained by integrating the squares of the differences between the average deceleration value (L) and the respective deceleration values (g) (in the third embodiment). Consequently, it is possible to decide whether the passenger protecting apparatus must be activated or not in any collision modes on the basis of simple adjustment.

Further, in the control system according to the present invention, the moment that the activation of the passenger protecting apparatus is decided, the passenger protecting apparatus is activated. Consequently, it is possible to activate the passenger protecting apparatus at an optimum timing in any collision modes.

What is claimed is:

1. A control system for a passenger protecting apparatus, comprising:

means for detecting vehicle deceleration values;

means for calculating a deceleration dispersion value on the basis of the detected deceleration values;

means for deciding whether or not the passenger protecting apparatus is to be activated on the basis of the calculated deceleration dispersion value; and drive and control means for activating the passenger protecting apparatus when said deciding means decides the activation of the passenger protecting apparatus.

2. A control system for a passenger protecting apparatus, comprising:

means for detecting vehicle deceleration values;

means for calculating a sum total of squares of differences between the detected deceleration values and an averaged deceleration value obtained within a predetermined time period, on the basis of the detected deceleration values;

means for deciding whether or not the passenger protecting apparatus is to be activated on the basis of the calculated sum total value; and drive and control means for activating the passenger protecting apparatus when said deciding means decides the activation of the passenger protecting apparatus.

3. The control system for a passenger protecting apparatus of claim 1, wherein said calculating means further calculates an integration value of the sum total of squares of differences between the detected deceleration values and an averaged deceleration value obtained within a predetermined time period, with respect to time; and said deciding means decides the activation of the passenger protecting apparatus on the basis of the further calculated integration value.

4. The control system for a passenger protecting apparatus of claim 1, which further comprises: means for deciding a timing at which the passenger protecting apparatus is activated on the basis of the detected deceleration values; and said drive and control means activates the passenger protecting apparatus when said deciding means decides the activation of the passenger protecting apparatus, at the timing decided by said timing deciding means.

5. The control system for a passenger protecting apparatus of claim 2, which further comprises:

timing deciding means for deciding a timing at which the passenger protecting apparatus is to be activated on the basis of the detected deceleration values; and wherein, when said deciding means decides that the passenger protecting apparatus is to be activated, said drive and control means activates the passenger protecting apparatus at the timing decided by said timing deciding means.

6. The control system for a passenger protecting apparatus of claim 5, wherein said timing deciding means decides said timing at which the passenger protecting apparatus is activated by calculating relative speed of a passenger relative to a vehicle body on the basis of the detected deceleration values and comparing the calculated relative speed of the passenger with a predetermined value V1, said drive and control means performing activation of the passenger protecting apparatus in response to a combination of said deciding means for deciding the activation of the passenger protecting apparatus and said timing deciding means for deciding the timing of activation of the passenger protecting apparatus.

7. A method of activating a passenger protecting apparatus, comprising the steps of:

detecting vehicle deceleration values g at sampling times;

detecting vehicle collision on the basis of the detected deceleration values;

calculating deceleration status Bu by the steps of:

calculating a sum total value L1 of deceleration values detected at previous sampling times;

calculating an average deceleration value L on the basis of the calculated sum total deceleration value L1 and the current number N of samples;

calculating a sum total value S of squares of differences between the calculated averaged deceleration value L and respective detected deceleration values g; and calculating a deceleration dispersion value Bu on the basis of the calculated sum total value S and the number T of samples;

comparing the calculated deceleration dispersion value Bu with a predetermined threshold value THL; and if the calculated deceleration dispersion value Bu exceeds the threshold THL, activating the passenger protecting apparatus.

8. A method of activating a passenger protecting apparatus, comprising the steps of:

detecting vehicle deceleration values g at sampling times;

detecting vehicle collision on the basis of the detected deceleration values;

calculating deceleration status as a dispersion value of the deceleration values by the steps of:

calculating a sum total value L1 of deceleration values detected at previous sampling times;

calculating an average deceleration value L on the basis of the calculated sum total deceleration value L1 and current number of samples N; and calculating a deceleration dispersion value as a sum total value Bu1 of squares of differences between the calculated average deceleration value L and respective detected deceleration values g; and comparing the calculated deceleration dispersion value Bu1 with a predetermined threshold value THL1; and if the calculated deceleration dispersion value Bu1 exceeds the threshold THL1, activating the passenger protecting apparatus.

9. A method of activating a passenger protecting apparatus, comprising the steps of:

detecting vehicle deceleration values g at sampling times;

detecting vehicle collision on the basis of the detected deceleration values;

calculating deceleration status by the steps of:

calculating a sum total value L1 of deceleration values detected at previous sampling times;

calculating an average deceleration value L on the basis of the calculated sum total deceleration value L1 and a current number of samples N;

calculating a sum total value S of squares of differences between the calculated averaged deceleration value L and respective detected deceleration values g; and calculating a deceleration dispersion value as an integration value Bu2 of the calculated sum total values S with respect to time;

comparing the calculated deceleration dispersion value Bu2 with a predetermined threshold value THL2; and if the calculated deceleration dispersion value Bu2 exceeds the threshold THL2, activating the passenger protecting apparatus.

10. The method of activating a passenger protecting apparatus of claim 9, wherein the predetermined threshold value THL2 is a linear function Increasing with increasing time.

11. A control system for activating a passenger protecting apparatus on the basis of vehicle deceleration values detected in case of collision, comprising:

means for detecting the vehicle deceleration values;

means for calculating a dispersion-based value of the detected vehicle deceleration values;

means for judging whether the dispersion-based value outputted by said calculating means exceeds a threshold value; and means responsive to said judging means for activating the passenger protecting apparatus when the dispersion-based value is judged by said judging means to exceed the threshold value.

12. The control system for activating a passenger protecting apparatus of claim 11, wherein the dispersion-based calculation value of the detected vehicle deceleration is a dispersion value Bu of the vehicle deceleration values detected within a predetermined time after collision.

13. The control system for activating a passenger protecting apparatus of claim 11, wherein said means for calculating the dispersion-based calculation value of the detected vehicle deceleration comprises:

first means for determining differences between a plurality of deceleration values and an averaged deceleration value obtained within a predetermined time period, and second means for determining a sum total of squares of the differences determined by said first means and for outputting a signal representative of said sum total as said dispersion-based value of the detected vehicle deceleration.

14. The control system for activating a passenger protecting apparatus of claim 11, wherein said means for calculating the dispersion-based calculation value of the detected vehicle deceleration comprises:

first means for determining differences between a plurality of deceleration values and an averaged deceleration value obtained within a predetermined time period, second means for determining a sum total of squares of the differences determined by said first means, and third means for integrating, with respect to time, the sum total obtained by said second means and for outputting a signal representative of the integrated sum total as said dispersion-based value of the detected vehicle deceleration.

15. The control system for activating a passenger protecting apparatus of claim 11, wherein the threshold value is a linear function with respect to time.

16. The control system for a passenger protecting apparatus of claim 5, wherein said timing deciding means decides said timing at which the passenger protecting apparatus is activated by calculating a relative speed V of a passenger relative to a vehicle body on the basis of the detected deceleration values and comparing the calculated relative speed of the passenger with a predetermined value V1 and outputs a timing signal in accordance with a result of said comparing, said means for deciding generating a decision signal indicative of whether the passenger protecting apparatus is activated or not, further including combining means for combining said timing signal and said decision signal to produce a combination signal, said drive and control means responsive to said combination signal for activation of the passenger protecting apparatus.

17. The control system for a passenger protecting apparatus of claim 16, wherein said combining means comprises logical product means for providing said combination signal as a logical product of said decision signal and said timing signal, whereby said drive and control means is responsive to a logical product of the decision signal and the timing signal for activation of the passenger protecting apparatus.

18. The control system for a passenger protecting apparatus of claim 6, wherein said drive and control means performs activation of the passenger protecting apparatus on the basis of a logical product of output signals of said deciding means and said timing deciding means.

* * * * *